United States Patent
Fujihashi

(10) Patent No.: US 10,531,005 B2
(45) Date of Patent: Jan. 7, 2020

(54) DISPLAY CONTROL APPARATUS, CONTROL METHOD, AND PROGRAM

(71) Applicant: CANON KABUSHIKI KAISHA, Tokyo (JP)

(72) Inventor: Naoto Fujihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/019,663

(22) Filed: Jun. 27, 2018

(65) Prior Publication Data

US 2019/0007622 A1 Jan. 3, 2019

(30) Foreign Application Priority Data

Jul. 3, 2017 (JP) .................................. 2017-130323

(51) Int. Cl.
| | |
|---|---|
| *H04N 5/232* | (2006.01) |
| *G06F 1/32* | (2019.01) |
| *G06F 3/041* | (2006.01) |
| *G06F 1/3234* | (2019.01) |
| *G06F 1/3231* | (2019.01) |

(52) U.S. Cl.
CPC ....... *H04N 5/23293* (2013.01); *G06F 1/3231* (2013.01); *G06F 1/3265* (2013.01); *H04N 5/232411* (2018.08); *G06F 3/041* (2013.01)

(58) Field of Classification Search
CPC ......... H04N 5/23293; H04N 5/232411; H04N 5/23216; G06F 1/3231; G06F 1/3265; G06F 3/041; G06F 3/0416; G06F 3/0488; G03B 17/00

See application file for complete search history.

(56) References Cited

U.S. PATENT DOCUMENTS

| | | | |
|---|---|---|---|
| 2011/0249165 A1* | 10/2011 | Churei | G03B 13/02 348/333.02 |
| 2012/0052920 A1* | 3/2012 | Kobayashi | H04M 1/72519 455/566 |
| 2012/0154307 A1* | 6/2012 | Nunomaki | G06F 1/3203 345/173 |
| 2017/0199620 A1* | 7/2017 | Ishitsuka | H04N 5/23216 |
| 2017/0278217 A1* | 9/2017 | Takahashi | H04N 1/00448 |
| 2017/0357317 A1* | 12/2017 | Chaudhri | G06F 3/0412 |
| 2019/0191101 A1* | 6/2019 | Ogawa | G02B 7/28 |

FOREIGN PATENT DOCUMENTS

JP 2011-232741 A 11/2011

* cited by examiner

*Primary Examiner* — Shahbaz Nazrul
(74) *Attorney, Agent, or Firm* — Cowan, Liebowitz & Latman, P.C.

(57) ABSTRACT

A display control apparatus includes: a touch detection unit that detects a touch operation on a first display unit; a proximity detection unit that detects object proximity; and a control unit that, when the first display unit is turned on and a second display unit is turned off, in response to object proximity being detected by the proximity detection unit before a touch operation is detected by the touch detection unit, turns off the first display unit and starts turning on the second display unit, and when the first display unit is turned on and a second display unit is turned off, in response to object proximity being detected by the proximity detection unit after a touch operation is detected by the touch detection unit and before a first predetermined time is exceeded, starts turning on the second display unit while maintaining the first display unit to be turned on.

27 Claims, 8 Drawing Sheets

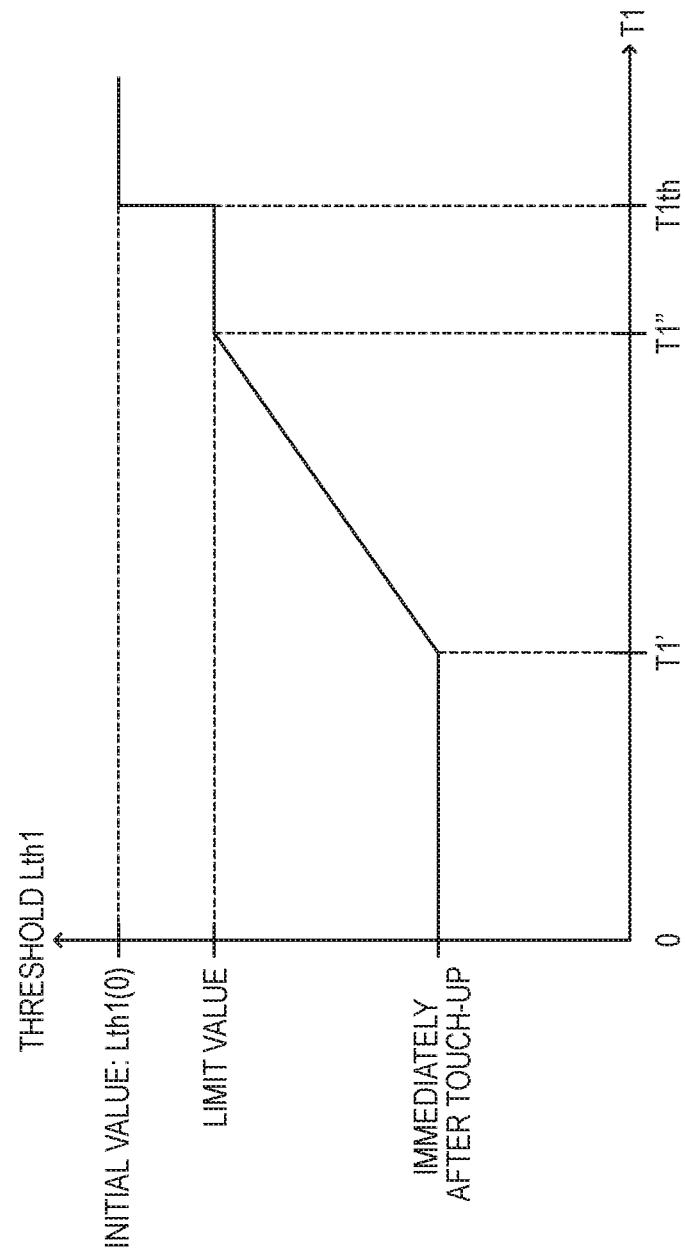

DISPLAY CONTROL APPARATUS, CONTROL METHOD, AND PROGRAM

BACKGROUND OF THE INVENTION

Field of the Invention

The present invention relates to a display control apparatus, a control method, and a program for controlling display in response to detection of an object.

Description of the Related Art

In devices having a touch panel unit, a device that can suppress power consumption by turning on a display unit of the touch panel unit is known. For example, there is an imaging device that has a proximity sensor arranged close to a finder and, when the proximity sensor detects an object, determines that a user accesses the finder, and turns off the display unit of the touch panel unit in order to suppress power consumption. However, when the proximity sensor erroneously detects a finger or a hand performing a touch operation while the user performs a touch operation on the touch panel unit, the display unit of the touch panel unit is turned off at the timing not indented by the user.

On the other hand, Japanese Patent Application Laid-Open No. 2011-232741 discloses an imaging device that, in a touchable region of the touch panel, disables a touch operation in a region close to the proximity sensor and enables a touch operation in a region distant from the proximity sensor, and thereby deters the user from moving the finger or the hand closer to the proximity sensor.

However, the device disclosed in Japanese Patent Application Laid-Open No. 2011-232741 is to deter the user from moving the finger or the hand closer to the proximity sensor, and it is thus difficult to solve the problem that the display unit is unintendedly turned off when an object comes close to the proximity sensor.

SUMMARY OF THE INVENTION

The present invention has been made in a view of the problem described above and intends to prevent the display unit from being unintentionally turned off.

A display control apparatus of the present invention includes: a touch detection unit that detects a touch operation on a first display unit; a proximity detection unit that detects object proximity; and a control unit that performs control that, when the first display unit is turned on and a second display unit is turned off, in response to object proximity being detected by the proximity detection unit before a touch operation is detected by the touch detection unit, turns off the first display unit and starts turning on the second display unit, and when the first display unit is turned on and the second display unit is turned off, in response to object proximity being detected by the proximity detection unit after a touch operation is detected by the touch detection unit and before a first predetermined time is exceeded, starts turning on the second display unit while maintaining the first display unit to be turned on.

According to the present invention, it is possible to prevent the display unit from being unintentionally turned off.

Further features of the present invention will become apparent from the following description of exemplary embodiments with reference to the attached drawings.

BRIEF DESCRIPTION OF THE DRAWINGS

FIG. 5 is a diagram illustrating a relationship between time and thresholds.

DESCRIPTION OF THE EMBODIMENTS

Preferred embodiments of the present invention will now be described in detail in accordance with the accompanying drawings.

A preferred embodiment of the present invention will be described below by using the accompanying drawings. In the present embodiment, an example in which the display control apparatus is a digital camera as an electric device (hereinafter, referred to as a camera) 100 will be described.

First Embodiment

Figure 1A:
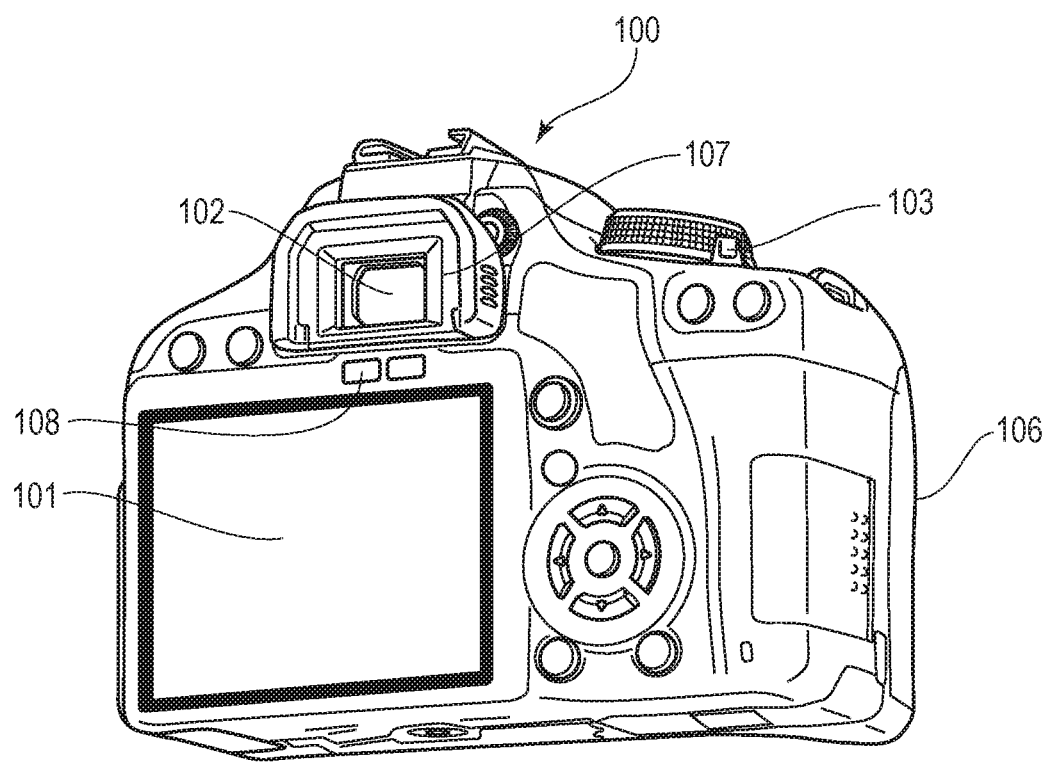
FIG. 1A and FIG. 1B are diagrams illustrating appearance of a digital camera.
Figure 1B:
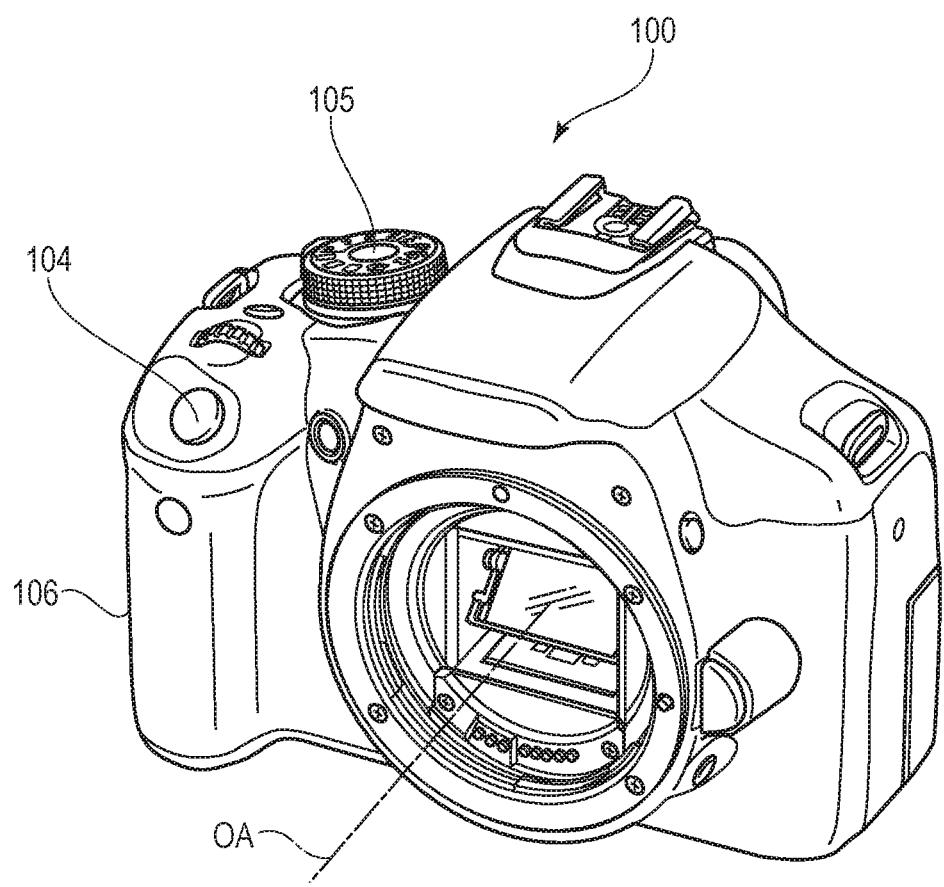

FIG. 1A and FIG. 1B are perspective diagrams illustrating one example of appearance of the camera 100. Note that, hereafter, if necessary, the subject side in a direction of the optical axis is referred to as the front side, and the upper side, the lower side, the left side, and the right side are defined in a direction viewed from the user (the photographer) located in the back side (behind the camera).

The camera 100 has a touch panel unit 101 that has a touch detection function on the back of the camera. The touch panel unit 101 is integrally formed of a display unit and a touch panel. The display unit of the touch panel unit 101 corresponds to an example of the first display unit, and the touch panel corresponds to an example of the touch detection unit. Further, the camera 100 includes an electric view finder (hereafter, referred to as an EVF) 102 on the back of the camera. The EVF 102 has a display unit located within the finder. The display unit of the EVF 102 corresponds to an example of the second display unit.

Further, the camera 100 includes a power switch 103 that switches on and off the power source, a shutter button 104 used for a capturing instruction, and a mode dial 105 used for switching capturing modes. Further, the camera 100 has a grip 106 for the user to stably hold the camera 100.

Note that the camera 100 is defined as in a normal position (a normal attitude) when the optical axis of a lens OA is horizontal to the ground and the surface on which the mode dial 105 is arranged is top. Further, with reference to the normal position, a state where the camera 100 is viewed from the touch panel unit 101 side and rotated counterclockwise by 90 degrees is defined as a grip-up state (vertical grip-up attitude), a state of being rotated clockwise by 90 degrees is defined as a grip-down state (vertical grip-down attitude), and a state of being rotated by 180 degrees is defined as an inverted position (inverted attitude).

Further, the camera 100 has a proximity sensor 108. The proximity sensor 108 detects an eye access state when the user moves the face closer to the eyepiece unit 107 of the EVF 102 to review the EVF 102. In response to an output value that is output by the proximity sensor 108, a distance L between the eyepiece unit 107 (or the proximity sensor 108) and an object in proximity is calculated. The relationship between the distance L and the output value of the proximity sensor 108 is in inverse proportion. That is, the shorter the distance between an object in proximity and the eyepiece unit 107 is, the larger the output value is. As the proximity sensor 108, an optical type sensor that detects a light emitted from an infrared LED and reflected by an object, an ultrasonic type sensor that detects ultrasonic waves oscillated by the transmitter and reflected by the object, or the like can be used. The proximity sensor 108 corresponds to an example of the proximity detection unit.

In the present embodiment, when the attitude of the camera 100 is in the normal position, the EVF 102 is arranged on the upper side of the touch panel unit 101, and the proximity sensor 108 is arranged between the touch panel unit 101 and the EVF 102. Without being limited to the positional relationship described above, however, any positional relationship of the touch panel unit 101, the EVF 102, and the proximity sensor 108 may be applied as long as their functions are realized.

Figure 2:
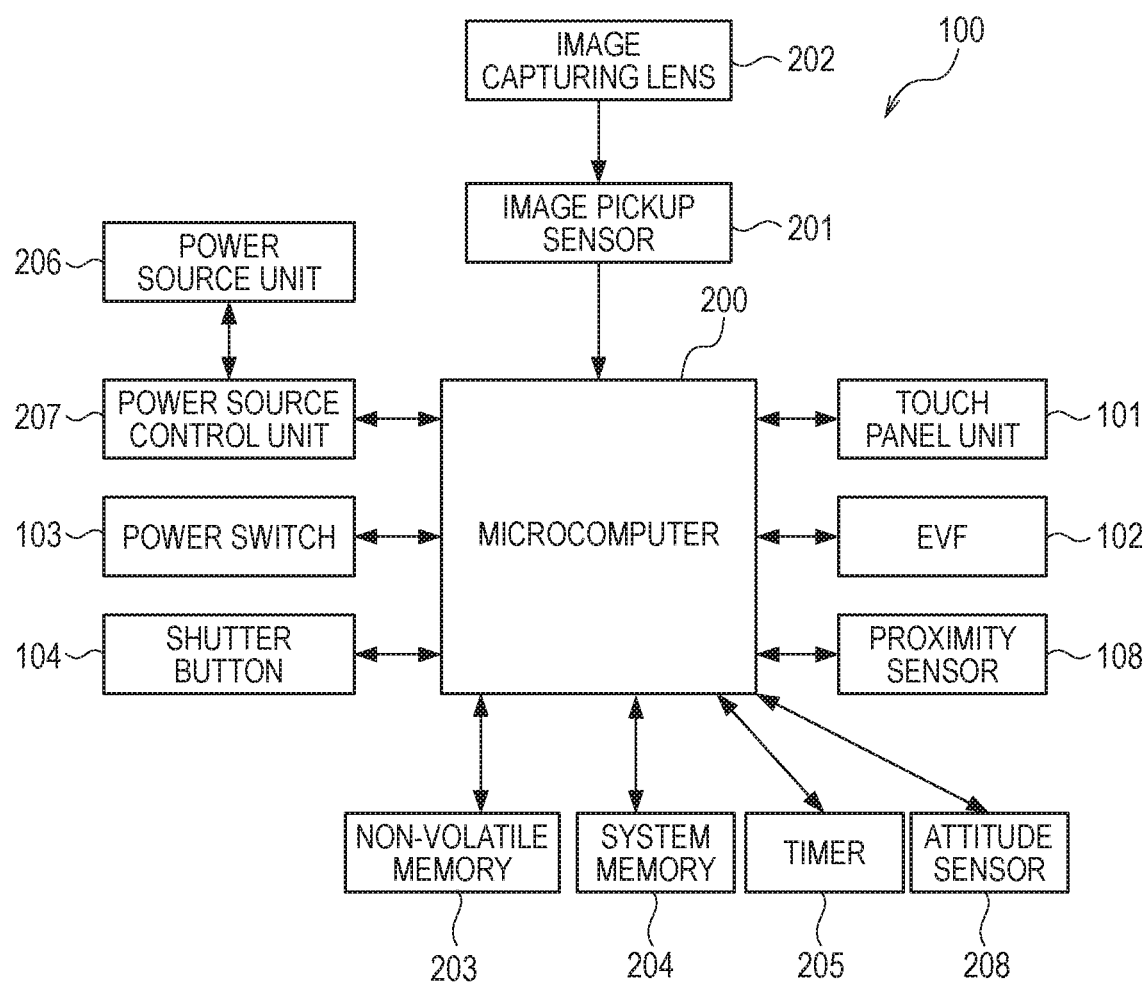
FIG. 2 is a diagram illustrating the inner structure of the digital camera.

FIG. 2 is a diagram illustrating an example of the inner structure of the camera 100.

The camera 100 includes a microcomputer 200, an image pickup sensor 201, an image capturing lens 202, a non-volatile memory 203, a system memory 204, a timer 205, a power source unit 206, a power source control unit 207, and an attitude sensor 208.

The microcomputer 200 functions as a central processing unit for controlling the entire camera 100. The microcomputer 200 corresponds to an example of the control unit that controls display on the touch panel unit 101 and display on the EVF 102. The image pickup sensor 201 captures a subject image. The image pickup sensor 201 is formed of a CCD element or a CMOS element that converts an optical image into an electric signal. The image pickup sensor 201 digitizes the electric signal by analog-to-digital (A/D) conversion and transmits the digitized signal to the microcomputer 200. The image capturing lens 202 forms a subject image on the image pickup sensor 201. The non-volatile memory 203 is a storage device for storing a program that implements a flowchart described below, data for image display, various setting values (setting information, thresholds), and the like. Data for image display includes, for example, data of a setting screen or icons for various settings of the camera 100. The system memory 204 is work memory that temporally stores a program that is executed by the microcomputer 200, various setting values, data, or the like. The timer 205 measures time from a predetermined trigger. The timer 205 starts time measurement from the time when the output value of the proximity sensor 108 exceeds a predetermined threshold, and after a predetermined time has elapsed, starts some operation. The power source unit 206 supplies power to each unit of the camera 100. The power source control unit 207 controls the power source unit 206. Note that the non-volatile memory 203 and the timer 205 may be embedded in the microcomputer 200.

Further, the microcomputer 200 is formed of at least one processor or circuit. In addition to controlling the entire camera 100, the microcomputer 200 performs an image correction process of image data received from the image pickup sensor 201. Further, the corrected image data, the data for image display received from the non-volatile memory 203, or both thereof are transmitted to the touch panel unit 101 or the EVF 102 and displayed thereon. Note that, when transmitting data to the touch panel unit 101 or the EVF 102, the microcomputer 200 converts the data into data having an image size or the number of pixels suitable for each display specification and transmits the converted data. The microcomputer 200 can transmit image data to the touch panel unit 101 and the EVF 102 at the same time, and thereby causes the touch panel unit 101 and the EVF 102 to display the same image data at the same time.

Further, the microcomputer 200 can detect the following operations performed on an operation screen of the touch panel unit 101 or states thereof:

An operation in which a finger or a pen that has not touched the touch panel unit 101 newly touches the touch panel 101. That is, a start of a touch (hereafter, referred to as a touch-down).

A state where a finger or a pen are continuously touching the touch panel unit 101 (hereafter, referred to as a touch-on).

An operation of moving a finger or a pen while touching the touch panel unit 101 (hereafter, referred to as a touch-move).

An operation of leaving a finger or a pen that has touched the touch panel unit 101. That is, the end of a touch (hereafter, referred to as a touch-up).

A state where nothing touches the touch panel unit 101 (hereafter, referred to as a touch-off).

When a touch-down is detected, a touch-on is also detected at the same time. Unless a touch-up is detected after a touch-down, a touch-on usually continues to be detected. When a touch-move is detected, a touch-on is also detected. When a touched position does not move, no touch-move is detected even when a touch-on is detected. After a touch-up of all the fingers or pens that have touched is detected, this results in a touch-off.

These operations, states, or position coordinates where a finger or a pen touches the touch panel unit 101 are notified to the microcomputer 200 via the inside bus. The microcomputer 200 determines which operation (touch operation) has been made on the touch panel unit 101 based on the notified information. For a touch-move, the movement direction of a finger or a pen that moves on the touch panel unit 101 can also be determined for each vertical component and horizontal component of the touch panel unit 101 based on the position coordinate change. When a touch-move that is longer than or equal to a predetermined distance is detected, it can be determined that a sliding operation is performed. An operation that a finger moves quickly over a certain distance while touching the touch panel unit 101 and leaves without delay is referred to as a flick. In other words, a flick is a quick tracing operation on the touch panel unit 101 so as to flip it by the finger. When a touch-move that is longer than or equal to the predetermined distance and faster than or equal to a predetermined speed is detected and a subsequent touch-up is detected without delay, it can be determined that a flick is performed (It can be determined that a flick occurs following a slide operation). Further, a touch operation of touching a plurality of points (for example, two points) at the same time and moving the touched positions closer to each other is referred to as a pinch-in, and a touch operation of separating the touched positions from each other is referred to as a pinch-out. A pinch-out and a pinch-in are collectively referred to as a pinch operation (or simply a pinch). The touch panel unit 101 may employ any of various schemes such as a resistive film scheme, a capacitive film scheme, a surface acoustic wave scheme, an infrared scheme, an electromagnetic induction scheme, an image recognition scheme, and an optical sensing scheme. Depending on the scheme, while there is a scheme in which detection of a contact on the touch panel unit 101 causes detection of a touch or a scheme in which detection of a finger or a pen coming close to the touch panel unit causes detection of a touch, any scheme may be employed.

Figure 3:
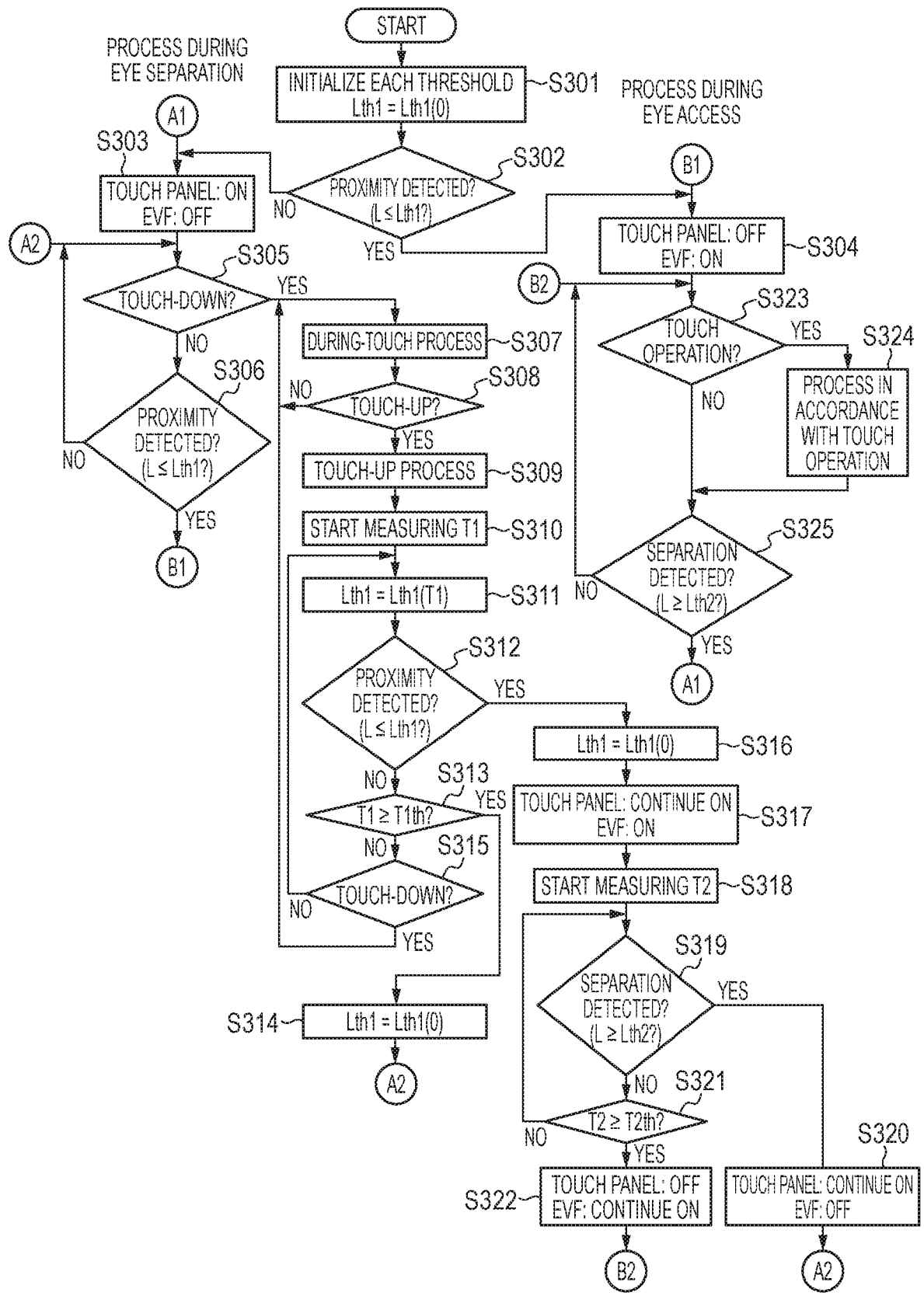
FIG. 3 is a flow chart illustrating the operation of a first embodiment.

FIG. 3 is a flowchart illustrating an example of the process of the camera 100 according to the first embodiment. This process is implemented by the microcomputer 200 expanding a program stored in the non-volatile memory 203 to the system memory 204 and executing the program. The microcomputer 200 starts the process of the flowchart of FIG. 3 in response to the camera 100 being started up in the capturing mode.

Note that FIG. 3 is a flowchart dedicated to the relationship between drive control of the touch panel unit 101 and the EVF 102 and touch operations to the touch panel unit 101, and other processes are omitted. In the actual implementation, at any timing of the process of FIG. 3, the microcomputer 200 performs capture preparation processes such as autofocus (AF), auto-exposure (AE), or the like in response to a half push operation of the shutter button 104. Further, at any timing of the process of FIG. 3, the microcomputer 200 performs a series of capture processes up to a process of storing an image captured by the image pickup sensor 201 in a memory card as an image file in response to a full push operation of the shutter button 104. Furthermore, in response to operations of various operating members, the microcomputer 200 performs capture setting (shutter speed, aperture value. ISO sensitivity, exposure correction, self-timer setting, strobe setting, or the like).

First, in S301, the microcomputer 200 initializes various thresholds used in the process. The microcomputer 200 initializes a distance threshold Lth1 used in detecting object proximity (eye access detection) to Lth1(0) that is an initial value. The initial value Lth1(0) corresponds to an example of the first predetermined distance. Further, the microcomputer 200 enables the proximity sensor 108 to detect an object coming close to the eyepiece unit 107.

In S302, the microcomputer 200 determines whether or not an object coming close to the eyepiece unit 107 of the EVF 102 (proximity object) is detected. More specifically, the microcomputer 200 determines whether or not the distance L between an object measured by the proximity sensor 108 and the eyepiece unit 107 of the EVF 102 is shorter than or equal to the threshold Lth1 used for proximity detection (whether or not within a predetermined distance). When the face (eye) of the user comes close to the eyepiece unit 107 of the EVF 102 and in an eye access state, the distance L is less than or equal to the threshold Lth1. Further, also when some object, for example, a hand, a finger, or the like of the user other than the face of the user comes close to the eyepiece unit 107 of the EVF 102, the distance L may be less than or equal to the threshold Lth1. If the distance L is less than or equal to the threshold Lth1, the process proceeds to S304 and, otherwise, proceeds to S303.

In S303, the microcomputer 200 turns on the touch panel unit 101 to enable the touch detection function. Further, the microcomputer 200 turns on (switches on a light of) a display unit of the touch panel unit 101 (hereafter, referred to as turning on the touch panel unit 101). What is displayed here is a live view image (hereafter, referred to as a LV image) captured by the image pickup sensor 201 and various setting information. Note that the microcomputer 200 may display only the various setting information without displaying the LV image. On the other hand, the microcomputer 200 turns off the EVF 102 and does not display by turning off (switching off the light of) the display unit of the EVF 102 (hereafter, referred to as turning off the EVF 102). Subsequently, a process during eye separation (not during eye access) is performed in the process on and after S305.

In S304, the microcomputer 200 switches on the EVF 102 to turn on the display unit of the EVF 102 (hereafter, referred to as turning on the EVF 102). What is displayed here is a LV image and various setting information captured by the image pickup sensor 201. Note that, when the mode is not the image capturing mode, the microcomputer 200 performs display other than a LV image. For example, in a case of a play mode, the microcomputer 200 displays an image read out from a memory card. On the other hand, the microcomputer 200 switches off the display unit of the touch panel unit 101 to turn off, namely, does not turn on the display unit of the touch panel unit 101 (hereafter, referred to as turning off the touch panel unit 101). Thereby, it is possible to suppress unnecessary power consumption and not to give a user a glare due to the display of the touch panel unit 101 at eye access. Note that it is assumed that the microcomputer 200 maintains the touch detection function of the touch panel unit 101 to be enabled. Subsequently, a process during eye access is performed in the process on and after S323.

In S305, the microcomputer 200 determines whether or not there is a touch-down on the touch panel unit 101. If there is a touch-down, the process proceeds to S307 and, otherwise, proceeds to S306. In this case, it is assumed that the touch panel unit 101 is displayed and the user performs a touch operation while viewing the display of the touch panel unit 101 without performing eye access.

In S306, in a similar manner to S302, the microcomputer 200 determines whether or not object proximity to the eyepiece unit 107 of the EVF 102 is detected. If proximity is detected, the process proceeds to S304 and, otherwise, returns to S305. Upon proceeding to S304, the microcomputer 200 switches the display, namely, turns off the touch panel unit 101 from a turn-on state, and turns on the EVF 102 from a turn-off state. In this case, there is substantially no time period in which both the touch panel unit 101 and the EVF 102 are turned on at the same time in switching of the display.

In S307, the microcomputer 200 performs a process during a touch in accordance with a touch operation. The process during a touch includes the following processes. First, it is a process in accordance with a touch-down (such as a change of a display form or sounding of an operation sound indicating that there is a touch, a touch AF process of setting an AF frame at the position of the touch-down, or the like). Further, it is a display indicating that a touch-on has been made (such as displaying an icon being touched in a manner identifiable from other icons). Further, it is a process in accordance with a touch-move (for example, a process of moving a slider bar displayed for setting a setting value of a particular setting item in accordance with a touch-move).

In S308, the microcomputer 200 determines whether or not there is a touch-up. If there is a touch-up, the process proceeds to S309 and, otherwise, returns to S307.

In S309, the microcomputer 200 performs a process in accordance with the touch-up. For example, when a touch-up is made from a state where an icon is touched, the microcomputer 200 performs a function allocated to the icon that has been touched.

In S310, the microcomputer 200 resets a time T1 and then uses the timer 205 to start measuring the time T1 from the time of a touch-up. The time T1 corresponds to an example of the elapsed time from detection of a touch operation.

In S311, the microcomputer 200 sets the threshold Lth1 used for proximity detection to a value that is smaller than (shorter than) the initial value Lth1(0). While this value may be a predetermined fixed value, in the present embodiment, the value is set to the variable Lth1(T1) that varies in accordance with the time T1 from the time of a touch-up. The variable Lth1(T1) corresponds to an example of the second predetermined time period. In such a way, the threshold Lth1 used for proximity detection is set to a value smaller than the initial value Lth1 (0), and thereby proximity is not determined unless an object comes closer to the EVF 102 than the proximity detected in a state before a touch operation (S302, S306). In other words, the microcomputer 200 is configured such that object proximity is less likely to be detected. Immediately after a touch-up, although there is a high likelihood of the finger or the like of the touch operation unnecessarily coming close to the EVF 102, unnecessary proximity is less likely to be detected by the process of S311, and it is therefore possible to prevent the touch panel unit 101 from being unintentionally turned off.

The variable Lth1(T1) is here set to a value that is smaller than the initial value Lth1(0) and gradually increases (becomes longer) with the time T1.

FIG. 5 is a diagram illustrating an example of the relationship between the time T1 and the variable Lth1(T1). In FIG. 5, the horizontal axis represents the time T1, and the vertical axis represents the threshold Lth1. The threshold Lth1 is a value that is smaller than the initial value Lth1(0) and is constant from the time immediately after a touch-up to the time T1'. Since there is a high likelihood of erroneous detection of a finger or the like from the time immediately after a touch-up to the time T1' (for example, around 0.2 seconds), the value is set constant from the time immediately after the touch-up. For example, when a flick in the upward direction is made on the touch panel unit 101, the finger that made the flick may come close to the eyepiece unit 107 of the EVF 102 within a short time from the touch-up. To address this, in the present embodiment, since the threshold Lth1 from the time of a touch-up to the time T1' is set particularly small, the likelihood of unnecessary detection of the finger that made a flick can be reduced. After the time T1', since a likelihood of erroneous detection of the finger or the like is low, the threshold Lth1 is set to gradually increase for easier detection. It is therefore possible to quickly turn on the EVF 102 in actual eye access instead of erroneous detection. In FIG. 5, the threshold Lth1 from the time T1' to the time T1" is set so as to increase in proportion to time.

Further, a limit value (less than the initial value Lth1(0)) may be provided to the threshold Lth1. In FIG. 5, the threshold Lth1 is set to be the limit value from the time T1" (for example, around 1 second) to the time T1th. With the threshold Lth1 being set so as not to be greater than the limit value, erroneous detection can be prevented. After the time T1th (for example, around 1.2 seconds), because it can be determined that there is little likelihood of erroneous detection, the threshold Lth1 is again set to the initial value Lth1(0) to prioritize the response of detection.

The purpose of such a setting of the threshold Lth1 is to deter proximity detection because the likelihood of erroneous detection caused by the finger or the like is high immediately after a touch-up and to gradually facilitate proximity detection because the likelihood of erroneous detection decreases with the time elapsing from the touch-up. Therefore, without being limited to an example of the graph illustrated in FIG. 5, other settings of the threshold Lth1 may be employed without departing from this purpose.

In S312, the microcomputer 200 determines whether or not object proximity to the eyepiece unit 107 of the EVF 102 is detected. More specifically, the microcomputer 200 determines whether or not the distance L between an object measured by the proximity sensor 108 and the eyepiece unit 107 of the EVF 102 is less than or equal to the threshold Lth1 used for proximity detection. The threshold Lth1 in this case has been set to the variable Lth1(T1) (less than the initial value Lth1(0)) in S311 described above, and thus detection of object proximity is less likely to be determined than in S302 and S306 described above. When the distance L is less than or equal to the threshold Lth1, the process proceeds to S316 and, otherwise, proceeds to S313.

In S313, the microcomputer 200 determines whether or not the time T1 from the time of a touch-up exceeds the threshold T1th. More specifically, the microcomputer 200 determines whether or not the time T1 is later than or equal to the threshold T1th. If the time T1 is later than or equal to the threshold T1th, the process proceeds to S314 and, otherwise, proceeds to S315. The threshold T1th corresponds to an example of the first predetermined time.

In S314, the microcomputer 200 sets the threshold Lth1 back to the initial value Lth1(0), and the process proceeds to S305.

In S315, the microcomputer 200 determines whether or not there is a touch-down on the touch panel unit 101. If there is a touch-down, the process proceeds to S307 and, otherwise, proceeds to S311.

In S316, the microcomputer 200 set the threshold Lth1 back to the initial value Lth1(0), and the process proceeds to S317.

In S317, while continuing to turn on the touch panel unit 101, the microcomputer 200 turns on the EVF 102. What is displayed here is an LV image captured by the image pickup sensor 201 and various setting information. In this case, both the touch panel unit 101 and the EVF 102 are turned on. Therefore, since the touch panel unit 101 is not turned off even when detection is made due to proximity by a finger or the like instead of eye access within a predetermined time from a touch-up, a good operability is not impaired when the user is reviewing the touch panel unit 101. In contrast, since the EVF 102 is turned on at eye access causes detection of proximity, the response of start of turning on of the EVF 102 is not impaired, and the user in eye access can immediately review the display of the EVF 102.

In S318, the microcomputer 200 resets a time T2 and then uses the timer 205 to start measuring the time T2 from the time when both the touch panel unit 101 and the EVF 102 are turned on (the time from detection of proximity). The time T2 corresponds to an example of the elapsed time from detection of object proximity.

In S319, the microcomputer 200 determines whether or not a state where an object is in proximity of the eyepiece unit 107 of the EVF 102 transfers to a state where the object is not in proximity, that is, whether or not separation of the object which has been in proximity of the eyepiece unit 107 is detected. More specifically, the microcomputer 200 determines whether or not the distance L between the object measured by the proximity sensor 108 and the eyepiece unit 107 of the EVF 102 is greater than or equal to the threshold Lth2 used for separation detection. The threshold Lth2 in this case is set such that the threshold Lth2 is greater than or equal to the threshold Lth1 (Lth1(0)). When the threshold Lth2 is the same as the threshold Lth1, the process of S319 is substantially the same as the process of S302 and S303. On the other hand, when the threshold Lth2 is greater than the threshold Lth1, this means that a hysteresis is provided between determination of proximity and determination of separation, and it is possible to avoid a situation where, once proximity is detected and the EVF 102 is turned on, separation is easily detected and the EVF 102 is turned off. If separation is detected, the process proceeds to S320 and, otherwise, proceeds to S321.

In S320, while continuing to turn on the touch panel unit 101, the microcomputer 200 turns off the EVF 102. In this case, it is assumed that proximity has been detected in S312 not because the user has made eye access but because the finger that made a touch operation or the like has been in proximity. Therefore, the microcomputer 200 suppresses power consumption by turning off the EVF 102 that is not necessary to be turned on.

In S321, the microcomputer 200 determines whether or not the time T2 exceeds the threshold T2th. More specifically, the microcomputer 200 determines whether or not the time T2 is later than or equal to the threshold T2th. The threshold T2th is set to the time until which the user is supposed to be in eye access. If the time T2 is later than or equal to the threshold T2th, the process proceeds to S322 and, otherwise, returns to S319. The threshold T2th corresponds to an example of the second predetermined time.

In S322, while continuing to turn on the EVF 102, the microcomputer 200 turns on the touch panel unit 101. In this case, it is assumed that proximity has been detected in S312 not because the finger that made a touch operation or the like has been in proximity but because the user has made eye access. Therefore, the microcomputer 200 suppresses power consumption by turning off the touch panel unit 101 that is not necessary to be turned on. The process then proceeds to S323 to perform a process during eye access.

In S323, the microcomputer 200 determines whether or not there is a touch operation. If it is determined that there is a touch operation, the process proceeds to S324, and the microcomputer 200 performs a process in accordance with the touch operation. If it is determined that there is no touch operation, the process proceeds to S325. In this case, it is assumed that the user is making a touch operation on the touch panel unit 101 in a state of eye access to the eyepiece unit 107 of the EVF 102. For example, it is possible to move the position of an AF frame displayed on the EVF 102 in accordance with a touch-move made on the touch panel unit 101. Note that, at eye access, the microcomputer 200 turns off the touch panel unit 101 and may disable the touch detection function so as not to perform the process of S323 and S324. This can further suppress power consumption in the touch panel unit 101 at eye access.

In S325, the microcomputer 200 determines whether or not a state where an object is in proximity of the eyepiece unit 107 of the EVF 102 transfers to a state where the object is not in proximity, that is, whether or not separation of the object which has been in proximity of the eyepiece unit 107 is detected. More specifically, the microcomputer 200 determines whether or not the distance L between an object measured by the proximity sensor 108 and the eyepiece unit 107 of the EVF 102 is greater than or equal to the threshold Lth2 used for separation detection. If separation is detected, the process proceeds to S303 and, otherwise, returns to S323.

In S303, the microcomputer 200 switches the display, namely, turns on the touch panel unit 101 from a turn-off state and turns off the EVF 102 from a turn-on state. In this case, there is substantially no time period in which both the touch panel unit 101 and the EVF 102 are turned on at the same time in switching the display. When the display is switched in S303, this is performed by detecting separation of the object that has been in proximity of the eyepiece unit 107 regardless of the elapsed time from the detection of a touch operation in S323.

In the present embodiment, when the touch panel unit 101 is turned on and the EVF 102 is turned off, object proximity is detected by the proximity sensor 108 after the time of a touch operation and before the threshold T1th is exceeded, and thereby turning on of the EVF 102 is started while the touch panel unit 101 is maintained to be turned on. Therefore, even when the finger that made a touch operation on the touch panel unit 101 or the like unnecessarily comes close to the EVF 102 and the proximity sensor 108 detects proximity, it is possible to prevent the touch panel unit 101 from being turned off against the user's intention. As discussed above, according to the present embodiment, it is possible to prevent a display unit from being unintentionally turned off. The display unit is not turned off unintentionally, which can improve the operability of a touch operation on the display unit.

Further, in the present embodiment, in a state where the EVF 102 is turned on while the touch panel unit 101 is maintained to be turned on, the touch panel unit 101 is turned off and the EVF 102 is maintained to be turned on in response to the threshold T2th being exceeded after proximity is detected by the proximity sensor 108. The fact that the proximity sensor 108 detects proximity and the threshold T2th is exceeded results in an assumption that the user is in eye access, and it is therefore possible to suppress power consumption by turning off the touch panel unit 101 that is not necessary to be turned on.

Further, in the present embodiment, let us assume that, in a state where the EVF 102 is turned on while the touch panel unit 101 is turned on, the proximity sensor 108 detects separation of the object after proximity is detected by the proximity sensor 108 and before the threshold T2th is exceeded. In this case, the EVF 102 is turned off while the touch panel unit 101 is maintained to be turned on. The fact that the proximity sensor 108 detects separation before the time T2th is exceeded results in assumption that the finger that made a touch operation or the like unnecessarily comes close to the EVF 102, and it is therefore possible to suppress power consumption by turning off the EVF 102 that is not necessary to be turned on.

Note that the process of S316 to S320 of the flowchart of FIG. 3 described above may be omitted to cause the process to proceeds to S304 if Yes is determined in S312 and cause the process to proceeds to S313 if No is determined in S312 in a similar manner as described above.

That is, the microcomputer 200 does not turn off the touch panel unit 101 even when an object approaches within the initial value Lth1(0) before the time T1 from the last detection of a touch operation exceeds the threshold T1th in a state where the microcomputer 200 turns on the touch panel unit 101. This process is caused because the threshold Lth1 in S312 is set to Lth1(T1) smaller than the initial value Lth1(0) and No is determined in S312.

On the other hand, the microcomputer 200 turns off the touch panel unit 101 when an object approaches within the value Lth1(T1) before the time T1 from the last detection of a touch operation exceeds the threshold T1th in a state where the microcomputer 200 turns on the touch panel unit 101. This process is caused because the threshold Lth1 in S312 is set to Lth1(T1) smaller than the initial value Lth1(0) and Yes is determined in S312 to branch to S304.

Further, when the time T1 from the last detection of a touch operation exceeds the threshold T1th in a state where the microcomputer 200 turns on the touch panel unit 101, Yes is determined in S313 and No is determined in S305 after S314 to branch to S306. In S306, if an object approaches within the initial value Lth1(0), the microcomputer 200 transfers the process to S304 and turns off the touch panel unit 101.

As discussed above, it is possible to prevent the touch panel unit 101 from being unintentionally turned off even when a finger that made a touch operation or the like approaches by the amount of adjustment of the threshold Lth1 before the time T1 from the detection of the touch operation exceeds the threshold T1th. Note that such control can also be applied to a mobile phone (smartphone or the like) having a touch panel unit. Some mobile phones have a proximity sensor that detects proximity of an ear of the user during a call and turns off the touch panel unit in response to detection of proximity of the ear during the call. Therefore, the touch panel unit may be turned off when, instead of an ear of the user, a finger that made a touch operation or the like is in proximity. On the other hand, with application of the present embodiment, during a period before the time T1 from detection of a touch operation exceeds the threshold T1th, the distance threshold used for detection of object proximity is smaller than that in periods other than the period before the threshold T1th is exceeded, and thus detection of proximity is less likely to be determined. It is therefore possible to prevent the touch panel unit from being unintentionally turned off.

Further, in the present embodiment, a case where the threshold Lth1 varies in accordance with the time T1 from a touch-up and the threshold T2th is the time by which the user is supposed to be in eye access in the present embodiment, the following may be taken into consideration for the setting.

First, the microcomputer 200 changes and sets the threshold Lth1 and the threshold T2th based on attitude information and motion information of the camera 100 before or after a touch operation. The microcomputer 200 acquires attitude information and motion information of the camera 100 from the attitude sensor 208. An acceleration sensor, a gyro sensor, an orientation sensor, an altitude sensor, a GPS (Global Positioning System) unit, or the like can be used for the attitude sensor 208. The attitude sensor 208 corresponds to an example of the attitude detection unit that detects attitude information or motion information of the camera 100.

For example, the microcomputer 200 acquires motion information indicating that a state where the touch panel unit 101 faces upward (the capturing direction is downward) (the lens optical axis is substantially perpendicular) and a touch-on is being made thereon transfers to a state where the camera 100 is in the normal position (the lens optical axis is substantially horizontal) after a touch-up. In this case, it can be assumed that the user is highly likely to be in an operation of moving the camera 100 closer to the face. Therefore, the microcomputer 200 sets the threshold Lth1 to be greater than the initial value Lth1(0) in order to turn on the EVF 102 as quickly as possible. Further, the microcomputer 200 sets the threshold T2th to be shorter than the normal value in order to turn off the touch panel unit 101 as quickly as possible. On the other hand, when the attitude of the camera 100 does not change after the touch-up and the above-described motion information is not acquired, since it can be assumed that the touch operation is highly likely to be continued, the threshold Lth1 and the threshold T2th are not changed. As discussed above, the microcomputer 200 can improve usability by quickly turning on the EVF 102 at eye access and can further suppress power consumption by quickly turning off the touch panel unit 101.

Note that, without being limited to change both the threshold Lth1 and the threshold T2th, the microcomputer 200 may change either the threshold Lth1 or the threshold T2th.

Second, the microcomputer 200 changes and sets the threshold Lth1 and the threshold T2th based on display content on the touch panel unit 101.

For example, when the display content is a setting screen for various settings of the camera 100 or a live view screen displaying a LV image, it can be assumed that the user is more likely to perform an eye access operation immediately after a touch-up on the live view screen than on the setting screen. Therefore, when the display content is a live view screen, the microcomputer 200 sets the threshold Lth1 to be larger in order to turn on the EVF 102 as quickly as possible. Further, the microcomputer 200 sets the threshold T2th to be shorter in order to turn off the touch panel unit 101 as quickly as possible. That is, the microcomputer 200 sets the threshold Lth1 set in S311 to be larger for the case where the display content is the live view screen than for the case where the display content is other screens than the live view screen. Alternatively, the microcomputer 200 sets the threshold Lth1 set in S311 to Lth1(T1) smaller than the initial value Lth1(0) on a screen other than the live view screen and maintains the threshold Lth1 to the initial value Lth1(0) on the live view screen. Further, the microcomputer 200 sets the threshold T2th shorter for the case where the display content is the live view screen than for the case where the display content is a screen other than the live view screen.

Further, the microcomputer 200 may change and set the threshold Lth1 and the threshold T2th based on whether the screen is a screen having a function allocated to a flick operation or a screen having no function allocated to a flick operation, without limited to the live view screen. That is, the microcomputer 200 increases the threshold Lth1 set in S311 for the screen having no function allocated to a flick operation or maintains the threshold Lth1 to the initial value Lth1(0).

Further, in the case of the setting screen, a touch operation is highly likely to be repeated, and there is a function allocated to a flick operation such as a vertical scroll of items. Therefore, the microcomputer 200 sets the threshold Lth1 set in S311 to be smaller for the setting screen than for a screen other than the setting screen in order to prevent erroneous detection of a finger or the like. Further, the microcomputer 200 sets the threshold T2th to be longer for the setting screen than for a screen other than the setting screen in order to prevent erroneous detection.

As discussed above, in the case of the display content that is highly likely to be followed by an eye access operation, the microcomputer 200 can improve usability by quickly turning on the EVF 102 at eye access and can further suppress power consumption by quickly turning off the touch panel unit 101. On the other hand, in the case of the display content that is highly likely to be followed by a touch operation, the microcomputer 200 can prevent erroneous detection by decreasing the distance threshold used for detection of object proximity.

Note that, without being limited to change both the threshold Lth1 and the threshold T2th, the microcomputer 200 may change either the threshold Lth1 or the threshold T2th.

Third, the microcomputer 200 changes and sets the threshold Lth1 and the threshold T2th based on contact angle information of a touch operation and attitude information of the camera 100.

Figure 6A:
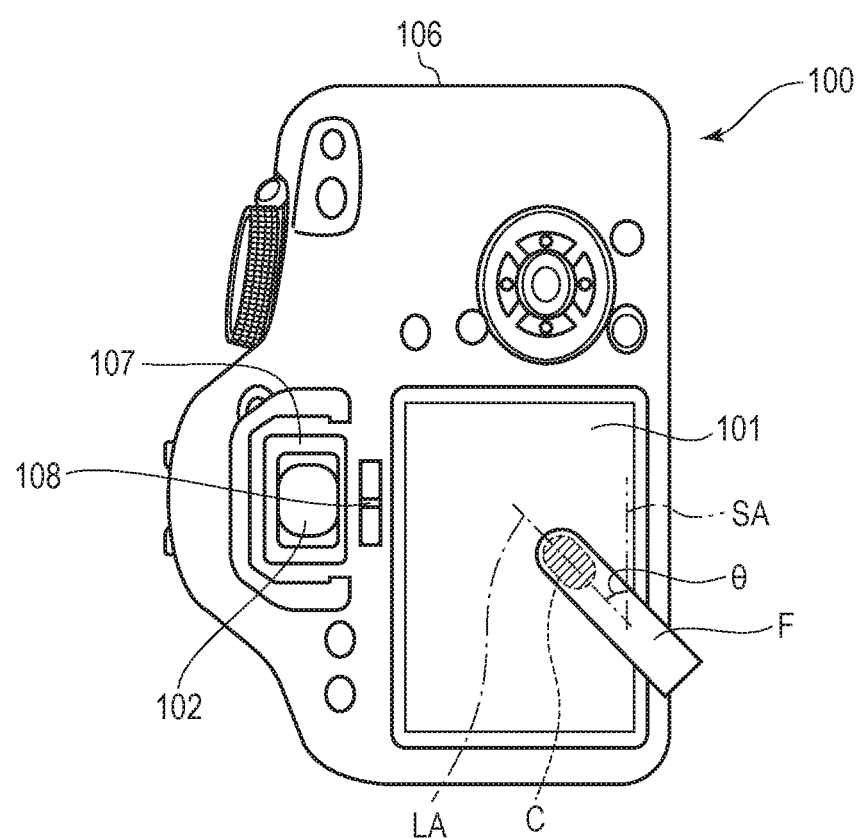
FIG. 6A and FIG. 6B are diagrams illustrating touch operations in the grip-up state and in a grip-down state.
Figure 6B:
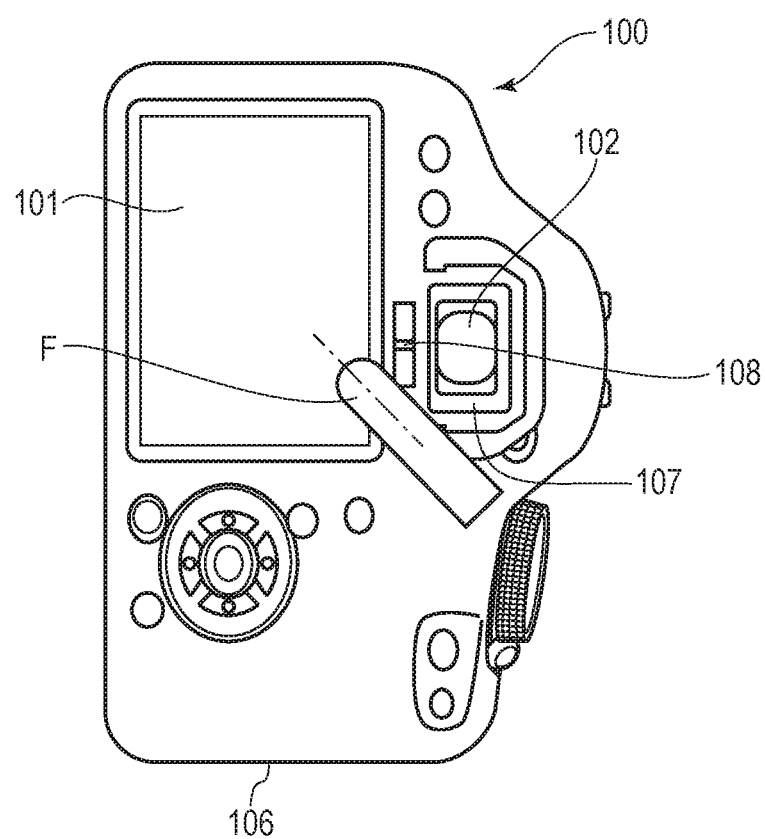

FIG. 6A and FIG. 6B are diagrams illustrating the contact angle in a touch operation and the attitude of the camera 100. For example, when the handedness in a touch operation is the right hand, the finger F is less likely to come close to the proximity sensor 108 in the case of a grip-up attitude of the camera 100 as illustrated in FIG. 6A. In contrast, the finger F is highly likely to come close to the proximity sensor 108 in a grip-down attitude of the camera 100 as illustrated in FIG. 6B, and thus erroneous detection is likely to occur.

Therefore, the microcomputer 200 determines the handedness based on contact angle information in the user's touch operation and changes and sets the threshold Lth1 and the threshold T2th based on the determined handedness and the attitude information of the camera 100.

A case of determining the user's handedness from contact angle information of a touch operation will now be described. As illustrated in FIG. 6A, when a touch operation is made with the finger F, the touch trace along which the touch panel unit 101 is touched becomes substantially an ellipse C. For example, the microcomputer 200 acquires the touch trace from the touch panel unit 101, approximates the touch trace as an ellipse and calculates the longer axis LA, and calculates the angle of the longer axis LA relative to the reference axis SA in the counterclockwise direction as the contact angle θ. As illustrated in FIG. 6A, when the camera 100 is in the grip-up state, the microcomputer 200 determines the user's handedness as the right hand when the frequency of the contact angle θ being +10 degrees to +80 degrees is high, for example. Further, when the camera 100 is in the grip-up state, the microcomputer 200 determines the user's handedness as the left hand when the frequency of the contact angle θ being +100 degrees to +170 degrees is high, for example. Note that the microcomputer 200 can similarly determine the handedness when the grip-down state.

In contrast, when the camera 100 is in the normal position, since the camera 100 is rotated by 90 degrees, the microcomputer 200 determines the user's handedness as the right hand when the frequency of the contact angle θ being +100 degrees to +170 degrees is high, for example. Further, when the camera 100 is in a normal position, the microcomputer 200 determines the user's handedness as the left hand when the frequency of the contact angle θ being +10 degrees to +80 degrees is high, for example.

Although the touch operation by which the microcomputer 200 determines the handedness may be a previous touch operation (the touch-down in S305 to the touch-up in S306), it is preferable to perform determination based on a plurality of touch operations from the startup of the camera 100 in order to improve determination accuracy. Note that a method of determining the user's handedness from the contact angle is not limited to the method described above, but other methods may be used for determination.

Next, when the determined handedness is the right hand and when the camera 100 is in the grip-up attitude (state of FIG. 6A), the microcomputer 200 sets the threshold Lth1 to be larger and the threshold T2th to be shorter than those in the case where the attitude of the camera 100 is in the normal position. Similarly, when the determined handedness is the left hand and when the camera 100 is in the grip-down attitude, the microcomputer 200 sets the threshold Lth1 is larger and the threshold T2th is shorter than those in the case of the attitude of the camera 100 is in the normal position. This allows for quick switch of the display from the touch panel unit 101 to the EVF 102 and suppression of power consumption.

In contrast, when the determined handedness is the right-hand and when the camera 100 is in the grip-down attitude (state of FIG. 6B), the microcomputer 200 sets the threshold Lth1 to be smaller and the threshold T2th to be longer than those in the case where the attitude of the camera 100 is in the normal position. Similarly, when the determined handedness is the left hand and when the camera 100 is in the grip-up attitude, the microcomputer 200 sets the threshold Lth1 to be smaller and the threshold T2th to be longer than those in the case where the attitude of the camera 100 is in the normal position. This allows for prevention of erroneous detection. As discussed above, it is possible to suppress power consumption for some attitude of the camera 100 while improving usability.

Note that, without being limited to change both the threshold Lth1 and the threshold T2th, the microcomputer 200 may change either the threshold Lth1 or the threshold T2th. Further, since the likelihood of the finger F coming close to the proximity sensor 108 varies according to the proximity sensor 108, it is preferable to change the threshold Lth1 and the threshold T2th taking the position of the proximity sensor 108 into consideration.

Fourth, the microcomputer 200 changes and sets the threshold T2th based on the distance to an object to be detected by the proximity sensor 108, more specifically, the distance L between the eyepiece unit 107 and the object.

For example, if the distance L is less than or equal to Lth1 in S312 and the process proceeds to S316, a smaller distance L in a state where the distance L is less than or equal to Lth1 results in an assumption that the likelihood of an eye access state is high. Therefore, in a state where the distance L is less than or equal to Lth1, the microcomputer 200 sets the threshold T2th to be smaller for the case of a larger distance L than for the case of a smaller distance L. It is therefore possible to quickly turn off the touch panel unit 101 and thus suppress power consumption.

Fifth, the microcomputer 200 changes and sets the threshold T2th based on the time from detection of a touch operation to detection of proximity by the proximity sensor 108. More specifically, the microcomputer 200 sets the threshold T2th so as to gradually decrease in accordance with the time from detection of a touch operation to detection of proximity by the proximity sensor 108.

For example, when the time from the start of time measurement of the time T1 in S310 to the detection of object proximity in S312 to proceed to S316 (hereafter, referred to as detection time) is long, it can be assumed that the user is highly likely to move to an eye access operation. Therefore, when the detection time is long, the microcomputer 200 sets the threshold T2th to be shorter for a long detection time than for a short detection time. It is therefore possible to quickly turn off the touch panel unit 101 and thus suppress power consumption. In contrast, when the detection time is short, it can be assumed that a finger that made a touch operation or the like is highly likely to be detected. Therefore, when the detection time is short, the microcomputer 200 sets the threshold T2th to be longer for a short detection time than for a long detection time. It is therefore possible to prevent erroneous detection.

Note that the methods of changing and setting the threshold Lth1 and the threshold T2th in the first to fifth described above can be combined as appropriate.

Second Embodiment

Figure 4:
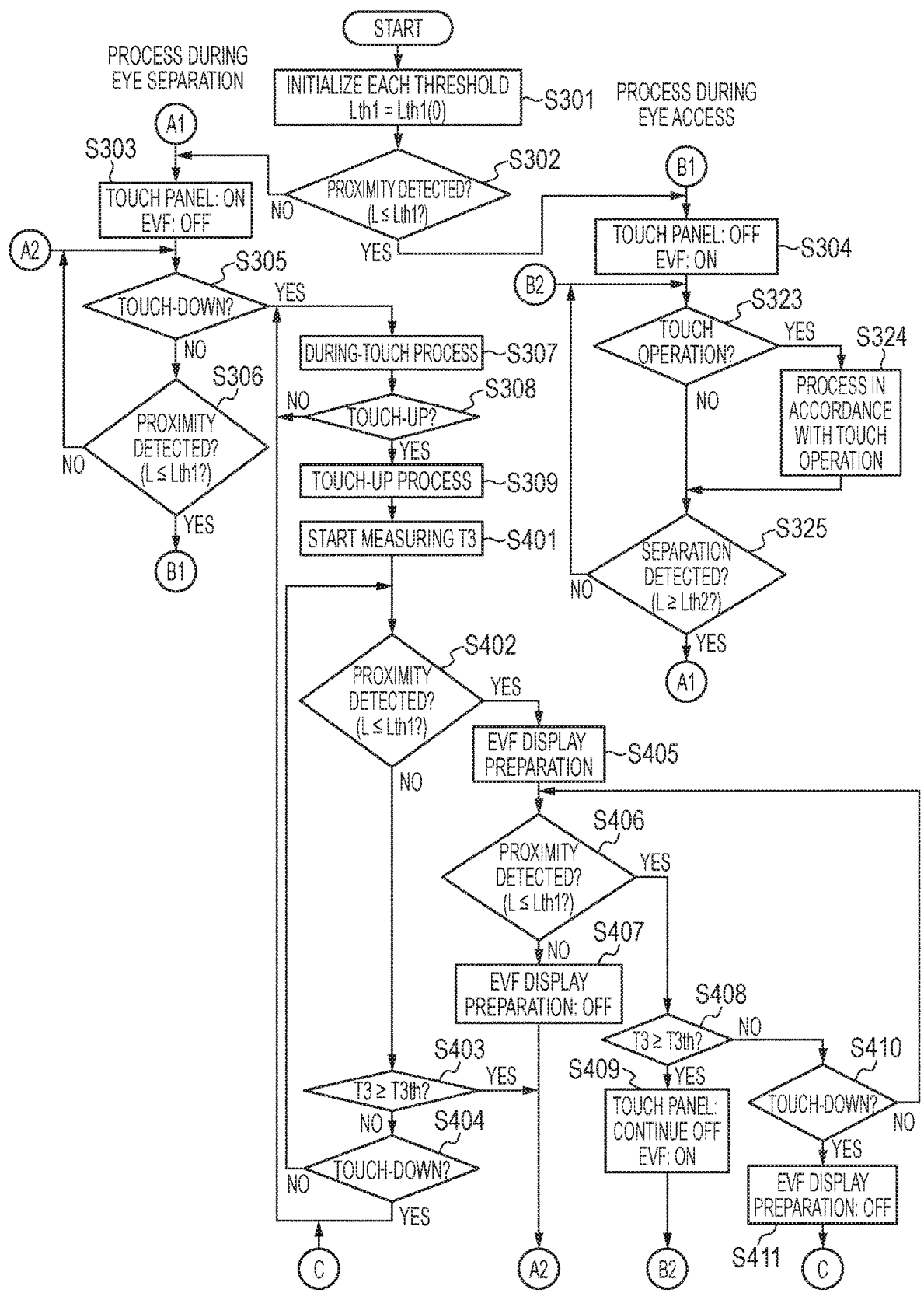
FIG. 4 is a flow chart illustrating the operation of a second embodiment.

FIG. 4 is a flowchart illustrating an example of the process of the camera 100 according to a second embodiment. This process is implemented by the microcomputer 200 expanding a program stored in the non-volatile memory 203 to the system memory 204 and executing the program. The microcomputer 200 starts the process of the flowchart of FIG. 4 in response to the camera 100 being started up in the image capturing mode.

Note that FIG. 4 is a flowchart dedicated to the relationship between drive control of the touch panel unit 101 and the EVF 102 and touch operations to the touch panel unit 101, and other processes are omitted. In the actual implementation, at any timing of the process of FIG. 4, the microcomputer 200 performs a capture preparation process such as AF, AE, or the like in response to a half push operation of the shutter button 104. Further, at any timing of the process of FIG. 4, the microcomputer 200 performs a series of image capturing operations up to an operation of storing an image captured by the image pickup sensor 201 in a memory card as an image file in response to a full push operation of the shutter button 104. Furthermore, in response to operations of various operating members, the microcomputer 200 performs image capturing setting (shutter speed, aperture value, ISO sensitivity, exposure correction, self-timer setting, strobe setting, or the like).

Further, the same processes of the flowchart of FIG. 4 are depicted with the same step numbers as those in the flowchart of FIG. 3 described above. The processes having the same step numbers as those of FIG. 3 will be omitted, and processes different from those of FIG. 3 will be described below. Note that the configuration of the camera 100 has the same configuration as that in the first embodiment described above.

In S401, the microcomputer 200 resets a timer T3 and then uses the timer 205 to start measuring the time T3 from a touch-up. The time T3 corresponds to an example of the elapsed time from detection of a touch operation.

In S402, the microcomputer 200 determines whether or not object proximity to the eyepiece unit 107 of the EVF 102 is detected. This process is the same as S302. If object proximity is detected, the process proceeds to S405 and, otherwise, proceeds to S403.

In S403, the microcomputer 200 determines whether or not the time T3 from a touch-up exceeds a threshold T3th. More specifically, the microcomputer 200 determines whether or not the time T3 is on or after the threshold T3th. If the time T3 is greater than or equal to the threshold T3th, the process proceeds to S305 and, otherwise, proceeds to S404. The threshold T3th corresponds to an example of the first predetermined time.

In S404, the microcomputer 200 determines whether or not there is a touch-down on the touch panel unit 101. If there is a touch-down, the process proceeds to S307 and, otherwise, proceeds to S402.

In S405, the microcomputer 200 performs a turn-on preparation process of the EVF 102. Here, only the preparation of display is performed, and the EVF 102 is not turned on. The turn-on preparation process means performing preparation of an electric circuit for display, for example, startup of a power source unit or the like without turning on the EVF 102. In such a way, even when an object comes close to the EVF 102 before the threshold T3th is exceeded, the microcomputer 200 does not determine that the user is in eye access because there is a likelihood of erroneous detection of a finger that made a touch operation or the like. Further, when determining that the user is in eye access, the microcomputer 200 performs a turn-on preparation process so as to be able to quickly turn on the EVF 102.

In S406, the microcomputer 200 determines whether or not object proximity to the eyepiece unit 107 of the EVF 102 is detected. This process is the same as S302. This process here determines whether or not a state of detecting object proximity is continued from S402. If object proximity is being detected, the process proceeds to S408 and, otherwise, proceeds to S407.

In S407, the microcomputer 200 ends the turn-on preparation process of the EVF 102 and turns the EVF 102 back to a state before the turn-on preparation process. In such a way, when no object comes close to the EVF 102 before the threshold T3th is not exceeded, the microcomputer 200 determines that the user is not in eye access and ends the turn-on preparation process of the EVF 102. That is, the turn-on preparation process is performed only during an object being in the proximity of the eyepiece unit 107 of the EVF 102, and thereby the EVF 102 can be quickly turned on after the threshold T3th is exceeded after the touch-up. On the other hand, the turn-on display preparation is not performed during an object not being in the proximity of the eyepiece unit 107 of the EVF 102, and thereby power consumption required for turn-on display preparation can be suppressed. Subsequently, the process proceeds to S305 to perform the process during eye separation.

In S408, the microcomputer 200 determines whether or not the time T3 from a touch-up exceeds the threshold T3th. This process is the same as S403. If the time T3 exceeds the threshold T3th, the process proceeds to S409 and, otherwise, proceeds to S410.

In S409, the microcomputer 200 turns on the EVF 102. The turn-on preparation process of the EVF 102 has already been made in this step, the EVF 102 can be more quickly turned on than in S304. Further, the microcomputer 200 turns off the touch panel unit 101. In such a way, when an object is in proximity of the EVF 102 even after the threshold T3th is exceeded, the microcomputer 200 determines that the user is in eye access and switches the display to be turned on from the touch panel unit 101 to the EVF 102. Subsequently, the process proceeds to S323 and performs a process during eye access.

In S410, the microcomputer 200 determines whether or not there is a touch-down on the touch panel unit 101. If there is a touch-down, the process proceeds to S411 and, otherwise, returns to S406.

In S411, the microcomputer 200 ends the turn-on preparation process of the EVF 102 that has been performed in S406 and turns the EVF 102 to the state before the turn-on preparation process. In this case, it is assumed that, because there is a new touch operation (touch-down), object proximity is detected in S402 not because the user is in eye access but because a finger that made a touch operation or the like is in proximity. Note that, when object proximity is detected in S402 by the user being in eye access, a touch-down may be detected by an unintended touch of a part of the face such as the nose to the touch panel unit 101. Therefore, the microcomputer 200 may not perform the process of S410 and S411.

In the present embodiment, in a state where the touch panel unit 101 is turned on, when object proximity is detected by the proximity sensor 108 before the threshold T3th is exceeded after a touch operation is last detected by the touch panel unit 101, the touch panel unit 101 is not turned off. Therefore, even when a finger that made a touch operation on the touch panel unit 101 or the like unnecessarily comes close to the proximity sensor 108 and the proximity sensor 108 detects the proximity, it is possible to prevent the touch panel unit 101 from being turned off against the user's intention. As discussed above, according to the present embodiment, it is possible to prevent the display unit from being unintentionally turned off. The display unit is not turned off unintentionally, which can improve operability of a touch operation to the display unit.

Further, in the present embodiment, when object proximity is detected by the proximity sensor 108 and then proximity of the object is continued to be detected up to the threshold T3th before the threshold T3th is exceeded after a touch operation is last detected by the touch panel unit 101, the touch panel unit 101 is turned off. The fact that the threshold T3th is exceeded after the proximity sensor 108 detects proximity means that the user is supposed to be in eye access, and thus power consumption can be suppressed by turning off the touch panel unit 101 that is not necessary to be turned on.

Note that, while the case where the display control apparatus is the camera 100 has been described in the second embodiment, the same applies to a mobile phone (smartphone or the like). Some mobile phones have a proximity sensor that detects proximity of an ear of the user during a call and turns off the touch panel unit in response to detection of proximity of the ear during the call. In this case, the touch panel unit may be turned off when, instead of an ear of the user, a finger that made a touch operation or the like is in proximity. Therefore, the second embodiment is applied, and when object proximity is detected by the proximity sensor 108 after a touch operation is last detected by the touch panel unit 101 and before the threshold T3th is exceeded, the microcomputer 200 does not turn off the touch panel unit 101. By doing so, it is possible to prevent a call screen, for example, of the touch panel unit 101 from being turned off against the user's intention.

While the present invention has been described above based on the preferred embodiments, the present invention is not limited to the above-described particular embodiments, and various forms not departing from the spirit of this invention are included in the present invention. Further, each of the embodiments described above is to merely illustrate one embodiment of the present invention, and the embodiments can be combined as appropriate.

Further, in the embodiments described above, various control described as being performed by the microcomputer 200 may be performed by a single hardware component or may be divided into processes of a plurality of hardware components to control the entire device.

Further, while the case where the present invention is applied to the camera 100 has been described as an example in the above embodiments, the invention is not limited to this case but can be applied to a device having a touch detection unit that detects a touch operation on the first display unit and the proximity detection unit that detects object proximity. That is, the present invention can be applied to a personal computer, a PDA, a mobile phone, a portable image viewer, a digital photo-frame, a game machine, an electronic book reader, a tablet terminal, a smartphone, a home appliance, or the like.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-130323, filed Jul. 3, 2017, which is hereby incorporated by reference herein in its entirety.

What is claimed is:

1. A display control apparatus comprising:
   a touch detection unit that detects a touch operation on a first display unit;
   a proximity detection unit that detects object proximity; and
   a memory and at least one processor which function as:
   a control unit that performs control that
   when the first display unit is turned on and a second display unit is turned off, in response to object proximity being detected by the proximity detection unit before a touch operation is detected by the touch detection unit, turns off the first display unit and starts turning on the second display unit, and
   when the first display unit is turned on and the second display unit is turned off, in response to object proximity being detected by the proximity detection unit after a touch operation is detected by the touch detection unit and before a first predetermined time is exceeded, starts turning on the second display unit while maintaining the first display unit to be turned on.

2. The display control apparatus according to claim 1, wherein the control unit performs control that
   in a state of turning on the second display unit while maintaining the first display unit to be turned on in response to object proximity being detected by the proximity detection unit after a touch operation is detected by the touch detection unit and before the first predetermined time is exceeded,
   in response to a second predetermined time being exceeded after object proximity is detected by the proximity detection unit, turns off the first display unit and maintains the second display unit to be turned on.

3. The display control apparatus according to claim wherein the control unit performs control that
   in a state of turning on the second display unit while maintaining the first display unit to be turned on in response to object proximity being detected by the proximity detection unit after a touch operation is detected by the touch detection unit and before the first predetermined time is exceeded, in response to separation of an object being detected by the proximity detection unit after object proximity is detected by the proximity detection unit and before a second predetermined time is exceeded, turns off the second display unit while maintaining the first display unit to be turned on.

4. The display control apparatus according to claim wherein the control unit performs control that changes the second predetermined time based on a time from detection of a touch operation by the touch detection unit to detection of object proximity by the proximity detection unit before the first predetermined time is exceeded.

5. The display control apparatus according to claim 2 further comprising an attitude detection unit that detects at least any one of attitude information and motion information of the display control apparatus, wherein the control unit performs control that changes the second predetermined time based on at least any one of attitude information and motion information of the display control apparatus detected by the attitude detection unit.

6. The display control apparatus according to claim 2, wherein the control unit performs control that changes the second predetermined time based on display content displayed on the first display unit when a touch operation is detected by the touch detection unit.

7. The display control apparatus according to claim 2 further comprising an attitude detection unit that detects attitude information of the display control apparatus, wherein the control unit performs control that acquires contact angle information of a touch operation on the first display unit and, based on the contact angle Information and attitude information of the display control apparatus detected by the attitude detection unit, changes the second predetermined time.

8. The display control apparatus according to claim 2, wherein the control unit performs control that changes the second predetermined time based on a distance to an object detected by the proximity detection unit.

9. A display control apparatus comprising:
a touch detection unit that detects a touch operation on a first display unit;
a proximity detection unit that detects object proximity; and
a memory and at east one processor which function as:
a control unit that performs control that
after a first predetermined time s exceeded after a touch operation is last detected by the touch detection unit in a state where the first display unit is turned on, turns off the first display unit when an object is detected within a first predetermined distance by the proximity detection unit, and
before the first predetermined time is exceeded after a touch operation is last detected by the touch detection unit in a state There the first display unit is turned on, does not turn off the first display unit even when au object is detected within the first predetermined distance by the proximity detection unit.

10. The display control apparatus according to claim 9, wherein the control unit performs control that, before the first predetermined time is exceeded after a touch operation is last detected by the touch detection unit in a state where the first display unit is turned on, turns off the first display unit when an object is detected within a second predetermined distance that is shorter than the first predetermined distance in the proximity detection unit.

11. A display control apparatus comprising:
a touch detection unit that detects a touch operation on a first display unit;
a proximity detection unit that detects object proximity; and
a memory and at least one processor which function as:
a control unit that perform control that
after a first predetermined time is exceeded after a touch operation is last detected by the touch detection unit in a state where the first display unit is turned on, turns off the first display unit when object proximity is detected by the proximity detection unit, and
before the first predetermined time is exceeded after a touch operation is last detected by the touch detection unit in a state where the first display unit is turned on, does not turn off the first display unit when object proximity is detected by the proximity detection unit.

12. The display control apparatus according to claim 11, wherein the control unit performs control that, after object proximity is detected by the proximity detection unit and before the first predetermined time is exceeded after a touch operation is last detected by the touch detection unit in a state where the first display unit is turned on, turns off the first display unit when object proximity is continued to be detected by the proximity detection unit before the first predetermined time is exceeded.

13. The display control apparatus according to wherein the control unit performs control that, in response to object proximity being detected by the proximity detection unit and before the first predetermined time is exceeded after a touch operation is last detected by the touch detection unit in a state where the first display unit is turned on, starts a turn-on preparation process of a second display unit and then turns on the second display unit when object proximity continued to be detected by the proximity detection unit before the first predetermined time exceeded.

14. The display control apparatus according to claim 11, wherein the control unit performs control that, in response to object proximity being detected by the proximity detection unit before the first predetermined time exceeded after a touch operation is last detected by the touch detection unit in a state where the first display unit is turned on, starts a turn-on preparation process of a second display unit and then ends the turn-on preparation process of the second display unit when object proximity is no longer detected, by the proximity detection unit.

15. The display control apparatus according to claim 1, wherein the control unit performs control such that, during a period after a touch operation is detected by the touch detection unit and before the first predetermined time is exceeded, object proximity is less likely to be detected by the proximity detection unit compared to a case where object proximity is detected by the proximity detection unit except for a period before the first predetermined time is exceeded.

16. The display control apparatus according to claim 1, wherein the control unit performs control that, during a period after a touch operation is detected by the touch detection unit and before the first predetermined time is exceeded, sets a distance threshold used for detection of object proximity in the proximity detection unit to be shorter than that in a period other than a period before the first predetermined time is exceeded.

17. The display control apparatus according to claim 1, wherein the control unit performs control that increases a distance threshold used for detection of object proximity in the proximity detection unit in accordance with a period after a touch operation is detected by the touch detection unit and before the first predetermined time is exceeded.

18. The display control apparatus according to claim 1, wherein the control unit performs control that, when separation of an object is detected by the proximity detection unit in a state where the first display unit is turned off and the second display unit is turned on, turns on the first display unit and turns off the second display unit regardless of an elapsed time after a touch operation is detected by the touch detection unit.

19. The display control apparatus according to claim 1, wherein the second display unit is a display unit located inside a finder.

20. The display control apparatus according to claim 1, wherein the control unit performs control that changes a distance threshold used for detection of object proximity in the proximity detection unit based on an elapsed time from detection of a touch operation by the touch detection unit.

21. The display control apparatus according to claim 1 further comprising an attitude detection unit that detects at least any one of attitude information and motion information of the display control apparatus,
wherein the control unit performs control that changes distance threshold used for detecting object proximity in the proximity detection unit based on at least one of attitude information and motion information of the display control apparatus detected by the attitude detection unit.

22. The display control apparatus according to claim 1, wherein the control unit performs control that changes a distance threshold used for detecting object proximity in the proximity detection unit based on display content displayed on the first display unit when a touch operation is detected by the touch detection unit.

23. The display control apparatus according to claim 1 further comprising an attitude detection unit that detects attitude information of the display control apparatus,
wherein the control unit performs control that acquires contact angle information of a touch operation on the first display unit and, based on the contact angle information and attitude information of the display control apparatus detected by the attitude detection unit, changes a distance threshold used for detecting object proximity in the proximity detection unit.

24. A control method of a display control apparatus having a touch detection unit that detects a touch operation on a first display unit and a proximity detection unit that detects object proximity; the method comprising:
a control step of performing control that
when the first display unit is turned on and a second display unit is turned off, in response to object proximity being detected by the proximity detection unit before a touch operation is detected by the touch detection unit, turns off the first display unit and starts turning on the second display unit, and
when the first display unit is turned on and a second display unit is turned off, in response to object proximity being detected by the proximity detection unit after a touch operation is detected by the touch detection unit and before a first predetermined time is exceeded, starts turning on the second display unit while maintaining the first display unit to be turned on.

25. A control method of a display control apparatus having a touch detection unit that detects a touch operation on a first display unit and a proximity detection unit that detects object proximity; the method comprising:
a control step of performing control that
after a first predetermined time is exceeded after a touch operation is last detected by the touch detection unit in a state where first display unit is turned on, turns off the first display unit when an object detected within a first predetermined distance by the proximity detection unit, and
before the first predetermined time is exceeded after a touch operation is last detected by the touch detection unit in a state where the first display turned on, does not turn off the first display unit even when a object is detected within the first p determined distance by the proximity detection unit.

26. A control method of a display control apparatus having a touch detection unit that detects a touch operation on a first display unit and a proximity detection unit that detects object proximity; the method comprising:
a control step of performing control that
after a first predetermined time is exceeded after a touch operation is last detected by the touch detection unit in a state where the first display unit is turned on, turns off the first display unit when object proximity detected by the proximity detection unit, and
before the first predetermined tithe is exceeded after a touch operation is last detected by the touch detection unit state where the first display unit is turned on, does not turn off the first display unit when object proximity is detected by the proximity detection unit.

27. A computer readable non-transitory storage medium which stores a program for causing a computer to function as a control unit of a display control apparatus, the display control apparatus comprising:
a touch detection unit that detects a touch operation on a first display unit;
a proximity detection unit that detects object proximity; and
a memory and at least one processor which function as:
the control unit that performs control that
when the first display unit is turned on and a second display unit is turned off, in response to object proximity being detected by the proximity detection unit before a touch operation is detected by the touch detection unit, turns off the first display unit and starts turning on the second display unit, and
when the first display unit is turned on and the second display unit is turned off, in response to object proximity being detected by the proximity detection unit after a touch operation is detected by the touch detection unit and before a first predetermined time is exceeded, starts turning on the second display unit while maintaining the first display unit to be turned on.

* * * * *